United States Patent
Tran et al.

(10) Patent No.: US 6,693,867 B1
(45) Date of Patent: Feb. 17, 2004

(54) METHOD AND SYSTEM FOR WINDOW REALIGNMENT USING PIPELINE AND SYNC CORRECTION TO CORRECT DATA FRAME BOUNDARIES

(75) Inventors: Paul Thanh Tran, Milpitas, CA (US); Shashank Sharan, Milpitas, CA (US)

(73) Assignee: Mosel Vitelic Corporation, San Jose, CA (US)

( * ) Notice: Subject to any disclaimer, the term of this patent is extended or adjusted under 35 U.S.C. 154(b) by 713 days.

(21) Appl. No.: 09/595,423

(22) Filed: Jun. 15, 2000

(51) Int. Cl.[7] .............................................. G11B 7/00
(52) U.S. Cl. ............................... 369/59.12; 369/47.48
(58) Field of Search ........................... 369/47.15, 47.16, 369/47.19, 47.22, 47.23, 47.24, 47.31, 47.46, 47.47, 47.48, 59.11, 59.12, 59.13, 59.17, 59.19, 59.2, 59.25, 59.24

(56) References Cited

U.S. PATENT DOCUMENTS

| | | | | |
|---|---|---|---|---|
| 5,276,674 A | * | 1/1994 | Tanaka ..................... | 369/53.15 |
| 5,446,715 A | * | 8/1995 | Satomura .................. | 369/47.18 |
| 5,502,699 A | * | 3/1996 | Yamasaki et al. ......... | 369/47.19 |
| 5,946,443 A | * | 8/1999 | Oh ............................. | 386/46 |
| 6,236,631 B1 | * | 5/2001 | Deguchi et al. .......... | 369/53.34 |
| 6,249,896 B1 | * | 6/2001 | Ho et al. .................... | 714/814 |
| 6,269,058 B1 | * | 7/2001 | Yamanoi et al. ......... | 369/47.28 |
| 6,536,011 B1 | * | 3/2003 | Jang et al. ................ | 369/47.28 |
| 6,594,217 B1 | * | 7/2003 | Reed ........................ | 369/59.19 |

* cited by examiner

*Primary Examiner*—William Korzuch
*Assistant Examiner*—Bach Vuong
(74) *Attorney, Agent, or Firm*—Sawyer Law Group LLP

(57) ABSTRACT

The present invention provides a method and system for window realignment to correct the data frame boundaries of data from an optical media. The present invention includes: determining if a sync pattern for a data frame is within a sync window; opening an extended sync window, if the sync pattern for the data frame is not within the sync window; determining if the sync pattern for the data frame is within the extended sync window; and realigning the sync window to the sync pattern in the extended sync window, if the sync pattern is within the extended sync window. The present invention utilizes an extended sync window to realign the sync window when the number of missing sync patterns in a data stream has exceeded a threshold number. In the preferred embodiment, the width of the extended sync window and the threshold number are programmable. In this manner, the sync window can be realigned before shifting of the data renders the data uncorrectable. This provides flexibility and avoids some data rereads, which improves the performance of optical drive. The present invention is also compatible with many different data formats.

28 Claims, 3 Drawing Sheets

METHOD AND SYSTEM FOR WINDOW REALIGNMENT USING PIPELINE AND SYNC CORRECTION TO CORRECT DATA FRAME BOUNDARIES

FIELD OF THE INVENTION

The present invention relates to the reading of data from optical media, and more particularly, to the realignment of the data stream when reading from the optical media.

BACKGROUND OF THE INVENTION

In reading data from an optical media, a conventional optical drive controller, such as a Compact Disc (CD) or Digital Video,Disc (DVD) controller, receives a data stream from the optical media via a Read Channel Interface. The data'stream could be a 1-bit, 2-bit, 4-bit, or 8-bit data stream, depending on the media. For CD media, a data frame contains a standard 24-bit sync pattern followed by 564 data bits, with merging bits included. For DVD media, a data frame contains a standard 32-bit sync pattern followed by 1456 data bits. The controller's sync processor scans for the sync pattern in the data frame to establish the frame boundary, using it as a reference mark to extract the data bits. Typically, the sync processor receives the data frame 1 bit at a time. Once the first two consecutive sets of sync patterns are found in two consecutive data frames, it will set this interval as the reference mark for subsequent sync marks, i.e., it will set the sync window. If the sync processor does not find a sync pattern at a later expected time, it will still maintain the same window.

When the data stream has minimal jittering or shifting, this conventional technique works reasonable well as the error correction scheme will correct the bit stream shift. Jittering, or shifting, refers to the erroneous dropping of bits from a data frame or the insertion of bits into the data frame due to noise in the data stream. The higher the bit speed of the optical drive, the higher the noise level. A problem arises that as the bit speed increases, there will be more shifting. This requires the controller to interrupt the data stream to realign the sync window by rereading the erroneous data frames, which requires time. This compromises the performance of the optical drive.

Accordingly, there exists a need for an improved method and system for window realignment to correct the data frame boundaries of data from an optical media. The present invention addresses such a need.

SUMMARY OF THE INVENTION

The present invention provides a method and system for window realignment to correct the data frame boundaries of data from an optical media. The present invention includes: determining if a sync pattern for a data frame is within a sync window; opening an extended sync window, if the sync pattern for the data frame is not within the sync window; determining if the sync pattern for the data frame is within the extended sync window; and realigning the sync window to the sync pattern in the extended sync window, if the sync pattern is within the extended sync window. The present invention utilizes an extended sync window to realign the sync window when the number of missing sync patterns in a data stream has exceeded a threshold number. In the preferred embodiment, the width of the extended sync window and the threshold number are programmable. In this manner, the sync window can be realigned before shifting of the data renders the data uncorrectable. This provides flexibility and avoids some data rereads, which improves the performance of optical drive. The present invention is also compatible with many different data formats.

DETAILED DESCRIPTION

The present invention provides an improved method and system for window realignment to correct the data frame boundaries of data from an optical media. The following description is presented to enable one of ordinary skill in the art to make and use the invention and is provided in the context of a patent application and its requirements. Various modifications to the preferred embodiment will be readily apparent to those skilled, in the art and the generic principles herein may be applied to other embodiments. Thus, the present invention is not intended to be limited to the embodiment shown but is to be accorded the widest scope consistent with the principles and features described herein.

The method and system in accordance with the present invention utilizes an extended sync window to realign the sync window when the number of missing sync patterns in a data stream has exceeded a threshold number. In this manner, the sync window can be realigned before shifting of the data renders the data uncorrectable. This method and system may be applied to a 1-bit, 2-bit, 4-bit, or 8-bit data stream.

To more particularly describe the features of the present invention, please refer to FIGS. 1 through 3 in conjunction with the discussion below.

Figure 1:
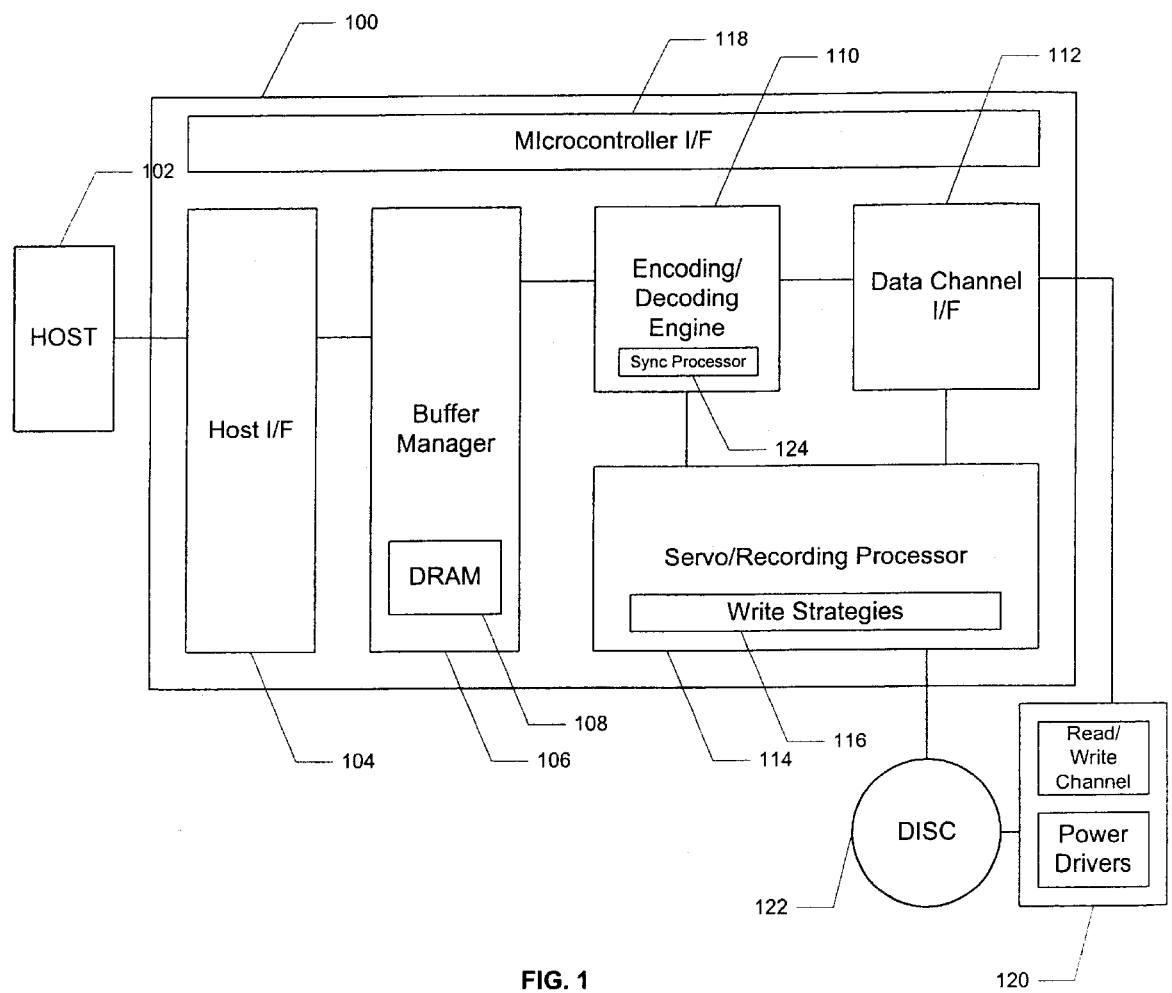
FIG. 1 is a block diagram illustrating a preferred embodiment of a controller which may use the method and system in accordance with the present invention.

FIG. 1 is a block diagram illustrating a preferred embodiment of a controller which may use the method and system in accordance with the present invention. The elements 104–118 represent the logical architecture of the controller 100. The controller 100 comprises a host interface 104, a buffer manager 106 with an embedded memory 108, an integrated encoding/decoding engine 110, a data channel interface 112, an integrated servo/recording processor 114 embedded with the write strategies 116, and a microcontroller interface 118. In the preferred embodiment, the embedded memory 108 is an embedded dynamic random access memory (DRAM). The integrated servo/recording processor 114 provides the mechanical control of the disc 120 and the spindle and sledge (not shown) of the drive for both reading and writing of data. The servo/recording processor 114 interfaces with the disc 122 in the writing of data. Integrated into the processor 114 are the write strategies 116 which controls the writing of the data so that they data is in a standard format. The write control logic in accordance with the present invention would be part of the servo/recording processor 114 for controller 100. The controller 100 is further described in co-pending U.S. patent application Ser. No. entitled "Integrated Controller To Process Both Optical Reads And Optical Writes Of Multiple Optical Media", Ser. No. 09/652,254 filed on Aug. 30, 2000. Applicant hereby incorporates this patent application by reference.

The method and system for window realignment in accordance with the present invention will be described in the context of the controller illustrated in FIG. 1, other controllers may be used without departing from the spirit and scope of the present invention.

Figure 2:
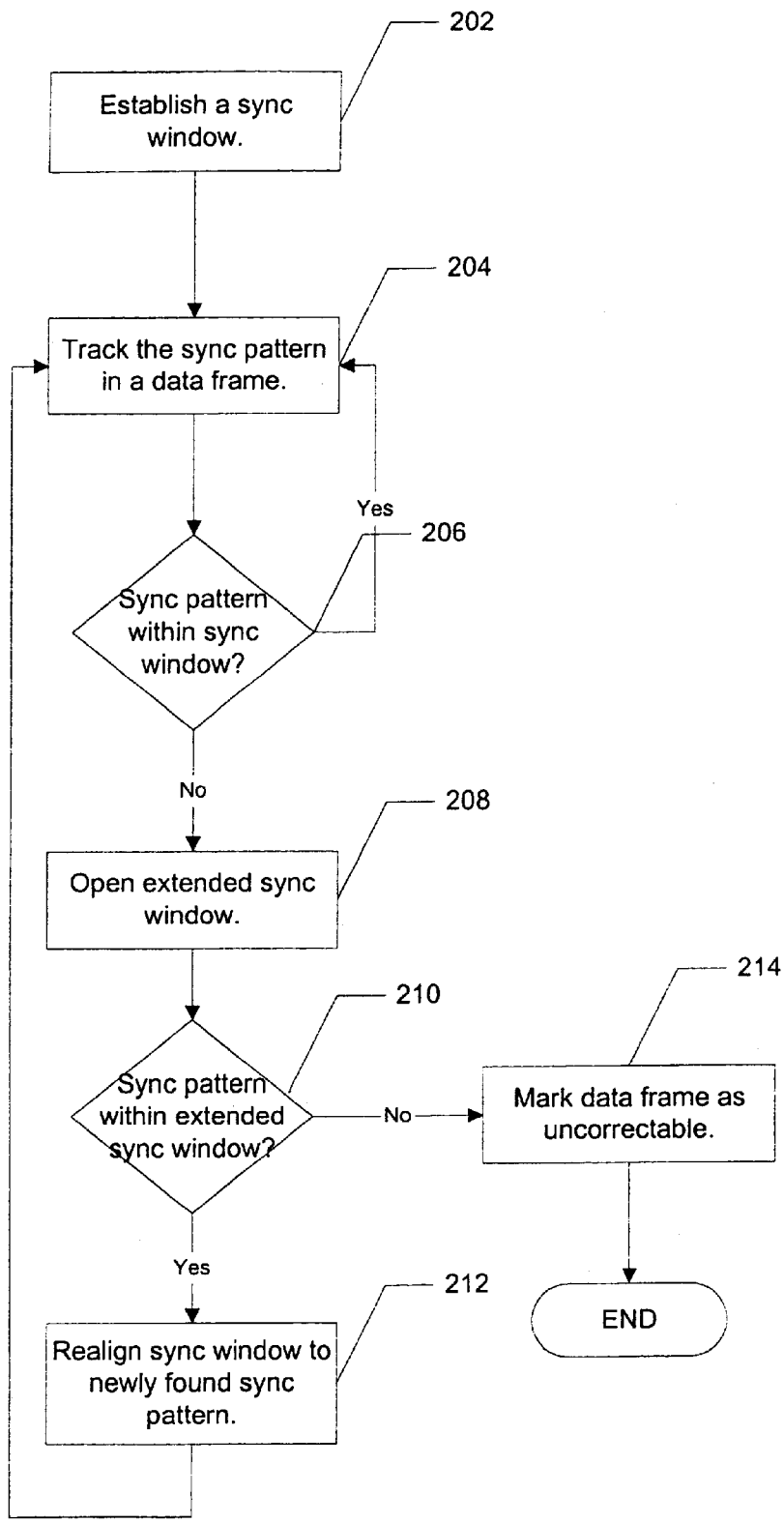
FIG. 2 is a flow; chart illustrating a preferred embodiment of a method for window realignment in accordance with the present invention.

FIG. 2 is a flow chart illustrating a preferred embodiment of a method for window realignment in accordance with the present invention. In the preferred embodiment, the method is implemented in hardware as a sync processor 124 (FIG. 1), which is part of the integrated encoding/decoding engine 110. However, it may be implemented in software, or in other parts of a controller, without departing from the spirit and scope of the present invention. First, a sync window is established, via step 202. In the preferred embodiment, the width of the sync window for CD media is 24-bits while the width for DVD media is 32-bits. Next, the sync pattern is tracked in a data frame of a data stream, via step 204. As long as the sync pattern for a data frame is within this sync window, as determined in step 206, the tracking continues. But when a sync pattern for a data frame is not within this sync window, as determined via step 206, then an extended sync window is opened, via step 208. In the preferred embodiment, for CD media, the extended sync window comprises the original 24-bit sync window, the 24-bits before the sync window, and the 24-bits after the sync window. For DVD media, the extended sync window comprises the original 32-bit sync window, the 32-bits before the sync window, and the 32-bits after the sync window. Then, it is determined if the sync pattern is detected within the extended sync window, via step 210. If so, then the sync window is realigned to the newly found sync pattern, via step 212, and the tracking via step 204 resumes. If not, then the data frame is marked as uncorrectable, via step 214. The data may then be reread from the optical media.

Figure 3:
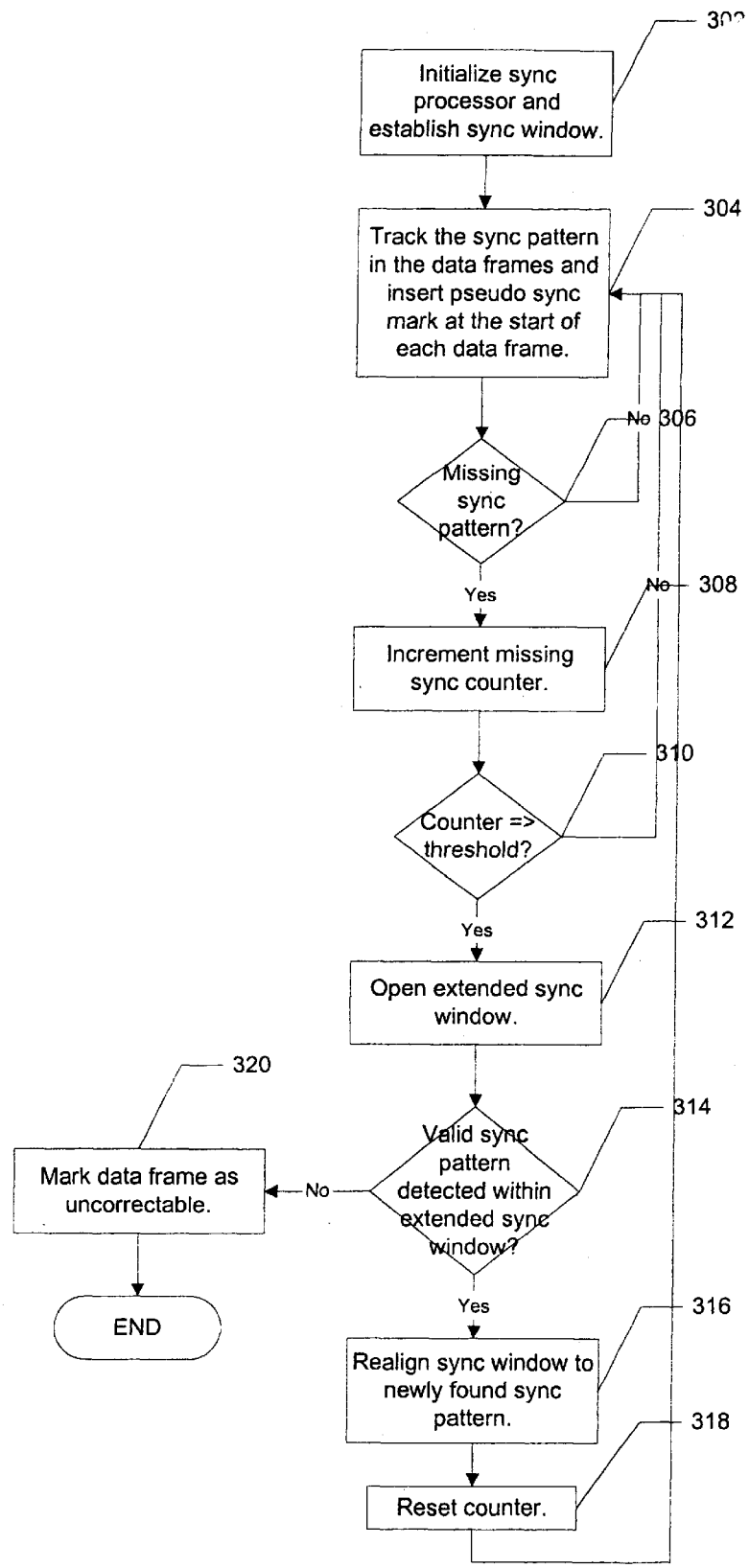
FIG. 3 is a flow chart illustrating in more detail the preferred embodiment of the method of window realignment in accordance with the present invention.

FIG. 3 is a flow chart illustrating in more detail the preferred embodiment of the method of window realignment in accordance with the present invention. First, the sync processor 124 is initialized, and the sync window is established, via step 302. In the preferred embodiment, the initialization of the sync processor 124 comprises setting a threshold number of missing sync patterns and the width of the extended sync window. These parameters are programmable. Assume, for purposes of describing the preferred embodiment, that the threshold number is set equal to 3, and the width of the extended sync window is set to 72-bits for CD media and 96-bits for DVD media.

When configured for CD media, the sync processor 124 will continuously look for the 24-bit pattern, "10000000 00010000 00000010", across a bank of four Eight to Fourteen Modulation (EFM) bytes from the data stream from the data channel interface 112, since this 3-byte sync pattern can straddle across the 4-byte sync window. As the sync processor 124 finds the first sync pattern, a sync detection logic of the sync processor 124 will the sync window according to this first sync pattern, and start a sync window timer to count the remaining bits of the 588-bit frame. If another valid sync pattern is found after the end of the count, the sync window is established for continuous tracking of subsequent sync patterns. Otherwise, the sync detection logic will restart to look for the first valid sync pattern.

When configured for DVD media, the sync processor 124 will continuously search for any one of the 32-bit sync patterns, illustrated in Table 1 below, across a bank of 5 EFM bytes from the data stream from the data channel interface 112, since the 4-byte sync pattern can straddle across the 5-byte sync window.

TABLE 1

| State - Type | Sync Name | Group 0<br>Bit Patterns | Group 1 |
|---|---|---|---|
| STATE 1&2 - P | SY0 | 0001 0010 0100 0 | 100 0000 0000 0001 0001 |
| STATE 1&2 - S | SY0 | 0001 0010 0000 0 | 100 0000 0000 0001 0001 0001 |
| STATE 3&4 - P | SY0 | 1001 0010 0000 0 | 100 0000 0000 0001 0001 0001 |
| STATE 3&4 - S | SY0 | 1001 0010 0100 0 | 100 0000 0000 0001 0001 0001 |
| STATE 1&2 - P | SY1 | 0000 0100 0000 0 | 100 0000 0000 0001 0001 0001 |
| STATE 1&2 - S | SY1 | 0000 0100 0100 0 | 100 0000 0000 0001 0001 0001 |
| STATE 3&4 - P | SY1 | 1000 0100 0100 0 | 100 0000 0000 0001 0001 |
| STATE 3&4 - S | SY1 | 1000 0100 0000 0 | 100 0000 0000 0001 0001 |
| STATE 1&2 - P | SY2 | 0001 0000 0000 0 | 100 0000 0000 0001 0001 |
| STATE 1&2 - S | SY2 | 0001 0000 0100 0 | 100 0000 0000 0001 0001 |
| STATE 3&4 - P | SY2 | 1001 0000 0100 0 | 100 0000 0000 0001 0001 |
| STATE 3&4 - S | SY2 | 1001 0000 0000 0 | 100 0000 0000 0001 0001 |
| STATE 1&2 - P | SY3 | 0000 1000 0000 0 | 100 0000 0000 0001 0001 |
| STATE 1&2 - S | SY3 | 0000 1000 0100 0 | 100 0000 0000 0001 0001 |
| STATE 3&4 - P | SY3 | 1000 0010 0100 0 | 100 0000 0000 0001 0001 |
| STATE 3&4 - S | SY3 | 1000 0010 0000 0 | 100 0000 0000 0001 0001 |
| STATE 1&2 - P | SY4 | 0010 0000 0000 0 | 100 0000 0000 0001 0001 |
| STATE 1&2 - S | SY4 | 0010 0000 0100 0 | 100 0000 0000 0001 0001 |
| STATE 3&4 - P | SY4 | 1000 1000 0100 0 | 100 0000 0000 0001 0001 |
| STATE 3&4 - S | SY4 | 1000 1000 0000 0 | 100 0000 0000 0001 0001 |
| STATE 1&2 - P | SY5 | 0010 0010 0100 0 | 100 0000 0000 0001 0001 |
| STATE 1&2 - S | SY5 | 0010 0010 0000 0 | 100 0000 0000 0001 0001 |
| STATE 3&4 - P | SY5 | 1000 1001 0000 0 | 100 0000 0000 0001 0001 |
| STATE 3&4 - S | SY5 | 1000 0001 0000 0 | 100 0000 0000 0001 0001 |
| STATE 1&2 - P | SY6 | 0010 0100 1000 0 | 100 0000 0000 0001 0001 |
| STATE 1&2 - S | SY6 | 0010 0000 1000 0 | 100 0000 0000 0001 0001 |
| STATE 3&4 - P | SY6 | 1001 0000 1000 0 | 100 0000 0000 0001 0001 |
| STATE 3&4 - S | SY6 | 1000 0000 0100 0 | 100 0000 0000 0001 0001 |
| STATE 1&2 - P | SY7 | 0010 0100 0100 0 | 100 0000 0000 0001 0001 |
| STATE 1&2 - S | SY7 | 0010 0100 0000 0 | 100 0000 0000 0001 0001 |
| STATE 3&4 - P | SY7 | 1000 1000 1000 0 | 100 0000 0000 0001 0001 |
| STATE 3&4 - S | SY7 | 1000 0000 1000 0 | 100 0000 0000 0001 0001 |

As the sync processor 124 finds the first sync pattern, the sync detection logic will realign the sync window according to this first sync pattern, and start a sync window timer to count the remaining 1456 bits of the 1488-bit frame. If another valid sync pattern is found after the end of the count, the sync window is established for continuous tracking of subsequent sync patterns; otherwise, the sync detection logic will restart to search for the first valid sync pattern.

Returning to FIG. 3, once the sync processor 124 is initialized and the sync window is established, via step 302, then the sync patterns in the data frames are tracked, and a pseudo sync mark is inserted at the start of each data frame, via step 304. When reading DVD media, the sync processor 124 will continue to track the sync patterns every 1488 bits, using the sync window established during step 302. The sync pattern tracked will follow one of the sync patterns set forth in Table 1. When reading CD media, the sync processor 124 will continue to track the sync pattern every 588 channel bits, using the sync window established during step 302. The sync pattern tracked is the fixed pattern "1000000000010000 00000010".

During tracking, the sync processor 124 also activates a pseudo sync insertion logic to insert a sync mark at the start of each DVD data frame for the duration of the 32-bit sync pattern or CD data frame for the duration of the 24-bit sync pattern, whether or not an actual sync pattern is found. This is to allow normal data flow during the decoding process.

When a sync pattern is determined to be missing from the sync window for a data frame, via step 306, then a missing sync counter will be incremented by one, via step 308. The missing sync counter tracks the number of missing sync patterns. If, via step 310, the missing sync counter equals or exceeds the threshold number of missing sync patterns set during step 302, an extended sync window is opened, via step 312.

In the preferred embodiment, for DVD media, an extended sync window comprising the 32-bit sync window, the 32-bits before the sync window, and the 32-bits after the sync window is opened. This extended sync window can be implemented using a 32-bit data holder. If a valid sync pattern is detected within the extended 96-bit sync window, via step 314, the sync window is realigned to the newly found sync pattern, via step 316, and the data flow is adjusted accordingly. The missing sync counter will also be reset, via step 318, since a new valid sync window has been established. Sync pattern tracking, via step 304, may then proceed. By using a 32-bit data holder, a 32-bit late sync window shift can be tolerated. By delaying the data flow up to 32-bits in the holder, a 32-bit early sync window shift can be realigned.

In the preferred embodiment, for CD media, an extended sync window comprising the 24-bit sync window, the 24-bits before the sync window, and the 24-bits after the sync window is opened. This extended sync window can be implemented in the same 32-bit data holder used for DVD media. If a valid sync pattern is detected within the extended 72-bit sync window, via step 314, the sync window is realigned to the newly found sync pattern, via step 316, and the data flow is adjusted accordingly. The missing sync counter will also be reset, via step 318, since a new valid sync window has been established. Sync pattern tracking, via step 304, may then proceed. By using 24-bits of the 32-bit data holder, a 24-bit late sync window shift can be tolerated. By delaying the data flow up to 24-bits in the holder, a 24-bit early sync window shift can be realigned.

If a valid sync pattern is not found within the extended sync window, then the data is marked as uncorrectable, via step 320. The data may then be reread from the optical media.

Although the preferred embodiment is illustrated with a pseudo sync insertion logic, one of ordinary skill in the art will understand that other methods of sync pattern tracking may be used without departing from the spirit and scope of the present invention.

A method and system for window realignment to correct the data frame boundaries of data from an optical media has been disclosed. The present invention utilizes an extended sync window to realign the sync window when the number of missing sync patterns in a data stream has exceeded a threshold number. In the preferred embodiments the width of the extended sync window and the threshold number are programmable. In this manner, the sync window can be realigned by digitally shifting and inserting bits before shifting of the data renders the data uncorrectable. This provides flexibility and avoids some data rereads, which improves the performance of optical drive. The present invention is also compatible with many different data formats.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for window realignment to correct the data frame boundaries of data from an optical media, comprising the steps of:
   (a) determining if a sync pattern for a data frame is within a sync window;
   (b) opening an extended sync window, if the sync pattern for the data frame is not within the sync window;
   (c) determining if the sync pattern for the data frame is within the extended sync window;
   (d) realigning the sync window to the sync pattern in the extended sync window, if the sync pattern is within the extended sync window and
   (e) marking the data frame as uncorrectable if the sync pattern is not within the extended sync window.

2. The method of claim 1, wherein the determining step (a) comprises:
   (a1) establishing the sync window;
   (a2) tracking the sync pattern in the data frame; and
   (a3) determining if the sync pattern for the data frame is within the sync window.

3. The method of claim 2, wherein the tracking step (a2) further comprises:
   (a2i) inserting a pseudo sync mark at a start of the data frame.

4. The method of claim 2, wherein the determining step (a3) further comprises:
   (a3i) determining if the sync pattern for the data frame is missing; and
   (a3ii) incrementing a counter if the sync pattern for the data frame is missing.

5. The method of claim 1, wherein the opening step (b) comprises:
   (b1) determining if a counter equals or exceeds a predetermined value, wherein the counter counts a number of sync patterns missing from a plurality of data frames; and
   (b2) opening the extended sync window if the counter equals or exceeds the predetermined value.

6. The method of claim 1, wherein the optical media comprises a Compact Disc (CD) media wherein a width of the extended sync window is 72-bits.

7. The method of claim 6, wherein the extended sync window comprises a 24-bit sync window, 24-bits prior to the 24-bit sync window, and 24-bits after the 24-bit sync window.

8. The method of claim 1, wherein the optical media comprises a Digital Video Disc (DVD) media wherein a width of the extended sync window is 96-bits.

9. The method of claim 8, wherein the extended sync window comprises a 32-bit sync window, 32-bits prior to the 32-bit sync window, and 32-bits after the 32-bit sync window.

10. The method of claim 1, further comprising:
(f) resetting a counter if the sync pattern is within the extended sync window, wherein the counter counts a number of sync patterns missing from a plurality of data frames; and
(g) returning to step (a).

11. The method of claim 1, wherein the data frame is stored in a 32-bit holder.

12. A method for window realignment to correct the data frame boundaries of data from an optical media, comprising the steps of:
(a) establishing a sync window;
(b) tracking a sync pattern in a data frame;
(c) determining if the sync pattern for the data frame is within the sync window;
(d) incrementing a counter if the sync pattern for the data frame is not within the sync window;
(e) determining if the counter equals or exceeds a predetermined value;
(f) opening an extended sync window if the counter equals or exceeds the predetermined value;
(g) determining if the sync pattern for the data frame is within the extended sync window; and
(h) realigning the sync window to the sync pattern in the extended sync window, if the sync pattern is within the extended sync window.

13. The method of claim 12, wherein the tracking step (b) further comprises:
(b1) inserting a pseudo sync mark at a start of the data frame.

14. The method of claim 12, wherein the optical media comprises a Compact Disc (CD) media wherein a width of the extended sync window is 72-bits.

15. The method of claim 14, wherein the extended sync window comprises a 24-bit sync window, 24-bits prior to the 24-bit sync window, and 24-bits after the 24-bit sync window.

16. The method of claim 12, wherein the optical media comprises a Digital Video Disc (DVD) media wherein a width of the extended sync window is 96-bits.

17. The method of claim 16, wherein the extended sync window comprises a 32-bit sync window, 32-bits prior to the 32-bit sync window, and 32-bits after the 32-bit sync window.

18. The method of claim 12, further comprising:
(i) resetting the counter if the sync pattern is within the extended sync window; and
(j) returning to step (b).

19. The method of claim 12, further comprising:
(i) marking the data frame as uncorrectable if the sync pattern is not within the extended sync window.

20. The method of claim 12, wherein the data frame is stored in a 32-bit holder.

21. A method for window realignment to correct the data frame boundaries of data from an optical media, comprising the steps of:
(a) establishing a sync window;
(b) tracking a sync pattern in a data frame;
(c) determining if the sync pattern for the data frame is within the sync window;
(d) incrementing a counter if the sync pattern for the data frame is not within the sync window;
(e) determining if the counter equals or exceeds a predetermined value;
(f) opening an extended sync window if the counter equals or exceeds the predetermined value;
(g) determining if the sync pattern for the data frame is within the extended sync window;
(h) realigning the sync window to the sync pattern in the extended sync window, if the sync pattern is within the extended sync window.
(i) resetting the counter if the sync pattern is within the extended sync window and returning to step (b); and
(j) marking the data frame as uncorrectable if the sync pattern is not within the extended sync window.

22. The method of claim 21, wherein the tracking step (b) further comprises:
(b1) inserting a pseudo sync mark at a start of the data frame.

23. The method of claim 21, wherein the optical media comprises a Compact Disc (CD) media wherein a width of the extended sync window is 72-bits.

24. The method of claim 23, wherein the extended sync window comprises a 24-bit sync window, 24-bits prior to the 24-bit sync window, and 24-bits after the 24-bit sync window.

25. The method of claim 21, wherein the optical media comprises a Digital Video Disc (DVD) media wherein a width of the extended sync window is 96-bits.

26. The method of claim 25, wherein the extended sync window comprises a 32-bit sync window, 32-bits prior to the 32-bit sync window, and 32-bits after the 32-bit sync window.

27. The method of claim 21, wherein the data frame is stored in a 32-bit holder.

28. A controller for an optical drive, comprising:
a data channel interface for receiving data frames from an optical media; and
a decoding engine coupled to the data channel interface, the decoding engine comprising a sync processor, the sync processor comprising:
means for determining if a sync pattern for a data frame is within a sync window;
means for opening an extended sync window, if the sync pattern for the data frame is not within the sync window;
means for determining if the sync pattern for the data frame is within the extended sync window,
means for realigning the sync window to the sync pattern in the extended sync window, if the sync pattern is within the extended sync window and
means for marking the frame as uncorrectable if the sync pattern is not within the extended sync window.

* * * * *